United States Patent
Osanai

(12) 
(10) Patent No.: US 9,374,686 B2
(45) Date of Patent: *Jun. 21, 2016

(54) MOBILE PHONE

(71) Applicant: KYOCERA Corporation, Kyoto (JP)

(72) Inventor: Takashi Osanai, Hirakata (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,163

(22) Filed: Jul. 2, 2015

(65) Prior Publication Data

US 2015/0312730 A1 Oct. 29, 2015

Related U.S. Application Data

(63) Continuation of application No. 13/869,731, filed on Apr. 24, 2013, now Pat. No. 9,077,809.

(30) Foreign Application Priority Data

Apr. 25, 2012 (JP) ................................. 2012-099751

(51) Int. Cl.
| | |
|---|---|
| *H04W 4/10* | (2009.01) |
| *H04M 1/725* | (2006.01) |
| *H04W 4/08* | (2009.01) |
| *H04M 1/2745* | (2006.01) |

(52) U.S. Cl.
CPC ............ *H04W 4/10* (2013.01); *H04M 1/72519* (2013.01); *H04M 1/72522* (2013.01); *H04M 1/72563* (2013.01); *H04W 4/08* (2013.01); *H04M 1/274525* (2013.01)

(58) Field of Classification Search
CPC .................... H04M 1/72519; H04M 1/72522; H04W 4/08; H04W 4/10
USPC ......................... 455/566, 90.2, 518, 519, 416
See application file for complete search history.

(56) References Cited

U.S. PATENT DOCUMENTS

| | | | |
|---|---|---|---|
| 9,077,809 B2 * | 7/2015 | Osanai | ............. H04M 1/72519 |
| 2007/0121669 A1 | 5/2007 | Ohno et al. | |
| 2008/0026703 A1 | 1/2008 | Chakraborty et al. | |
| 2009/0156246 A1 | 6/2009 | Toba | |

(Continued)

FOREIGN PATENT DOCUMENTS

| | | |
|---|---|---|
| JP | 2006-013615 A | 1/2006 |
| JP | 2006-323850 A | 11/2006 |
| JP | 2007-274500 A | 10/2007 |
| JP | 2008-236640 A | 10/2008 |

(Continued)

OTHER PUBLICATIONS

Office Action dated Aug. 4, 2015, issued in counterpart Japanese application No. 2012-099751.

*Primary Examiner* — Barry Taylor
(74) *Attorney, Agent, or Firm* — Procopio, Cory, Hargreaves & Savitch LLP

(57) ABSTRACT

A mobile phone provided with a push-to-talk function and methods for operating a mobile phone provided with a push-to-talk function are disclosed. An operation receiving module is configured to receive a user operation. A display control module is configured to cause a display module to display both first information relevant to a push-to-talk call and second information relevant to a function other than the push-to-talk, if the user operation for executing the function other than the push-to-talk is received during the push-to-talk call.

14 Claims, 13 Drawing Sheets

(56) References Cited

U.S. PATENT DOCUMENTS

| | | |
|---|---|---|
| 2012/0105309 A1 | 5/2012 | Kamachi et al. |
| 2012/0117507 A1* | 5/2012 | Tseng ............... H04M 1/72552 715/774 |
| 2013/0109426 A1 | 5/2013 | Kerger et al. |

FOREIGN PATENT DOCUMENTS

| | | |
|---|---|---|
| JP | 2008-306756 A | 12/2008 |
| WO | 2007/040056 A1 | 4/2007 |
| WO | 2007/102453 A1 | 9/2007 |

\* cited by examiner

MOBILE PHONE

CROSS REFERENCE TO RELATED APPLICATION

The present application is a continuation of U.S. patent application Ser. No. 13/869,731 filed on 24 Apr. 2013 which claims priority under 35 U.S.C. §119 to Japanese Patent Application No. 2012-099751, filed on 25 Apr. 2012, entitled "MOBILE PHONE". The content of each of the above referenced applications is incorporated by reference herein in its entirety.

TECHNICAL FIELD

Embodiments of the present disclosure relate generally to mobile phones, and more particularly relate to mobile phone comprising the Push-to-Talk (PTT) function.

BACKGROUND ART

Recent years have seen prevalence of mobile phones provided with the PTT function and of the PTT service which enables one-to-many group communication among the mobile phone users. The PTT function is a voice communication function that enables voice to be transmitted only while the talk button of a mobile phone is pushed. In the PTT service, the only user who is granted the right to speak (hereinafter "Floor") is permitted to talk.

In addition, during a one-to-many group call enabled by the PTT function, the mobile phone can display a screen including the names and phone numbers of the participants of the group call.

SUMMARY

A mobile phone provided with a push-to-talk function and methods for operating a mobile phone provided with a push-to-talk function are disclosed. An operation receiving module is configured to receive a user operation. A display control module is configured to cause a display module to display both first information relevant to a push-to-talk call and second information relevant to a function other than the push-to-talk, if the user operation for executing the function other than the push-to-talk is received during the push-to-talk call.

In another embodiment, a method for controlling a mobile phone provided with a push-to-talk function receives a user operation. The method also displays both information relevant to a push-to-talk call and information relevant to a function other than the push-to-talk call, if a user operation for executing the function other than the push-to-talk is received during the push-to-talk call.

In further embodiment, a non-transitory computer readable storage medium comprises computer-executable instructions for operating a mobile phone provided with a push-to-talk function. The computer-executable instructions receive a user operation and display both information relevant to a push-to-talk call and information relevant to a function other than the push-to-talk call, if a user operation for executing the function other than the push-to-talk is received during the push-to-talk call.

DESCRIPTION OF EMBODIMENT

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The following describes a mobile phone 100 according to the embodiment of the disclosure.

The mobile phone 100 is provided with the PTT function and thus is capable of a one-to-many PTT call.

To start a PTT call, the mobile phone 100 first logs in to a server (not illustrated) that mediates the PTT call. Next, the mobile phone 100 designates one or more other mobile phones also provided with the PTT function as the participants in the PTT call. If the user of the mobile phone 100 pushes the talk button during the time the Floor is released, the mobile phone 100 is granted the Floor. If any of the other mobile phones designated by the mobile phone 100 has been logged in to the server, the mobile phone 100 can transmit voice communication to the currently logged-in mobile phones at once. When the user of the mobile phone 100 releases the talk button, the Floor is released and thus the user can listen to voice communication transmitted from one of the participants.

Figure 1:
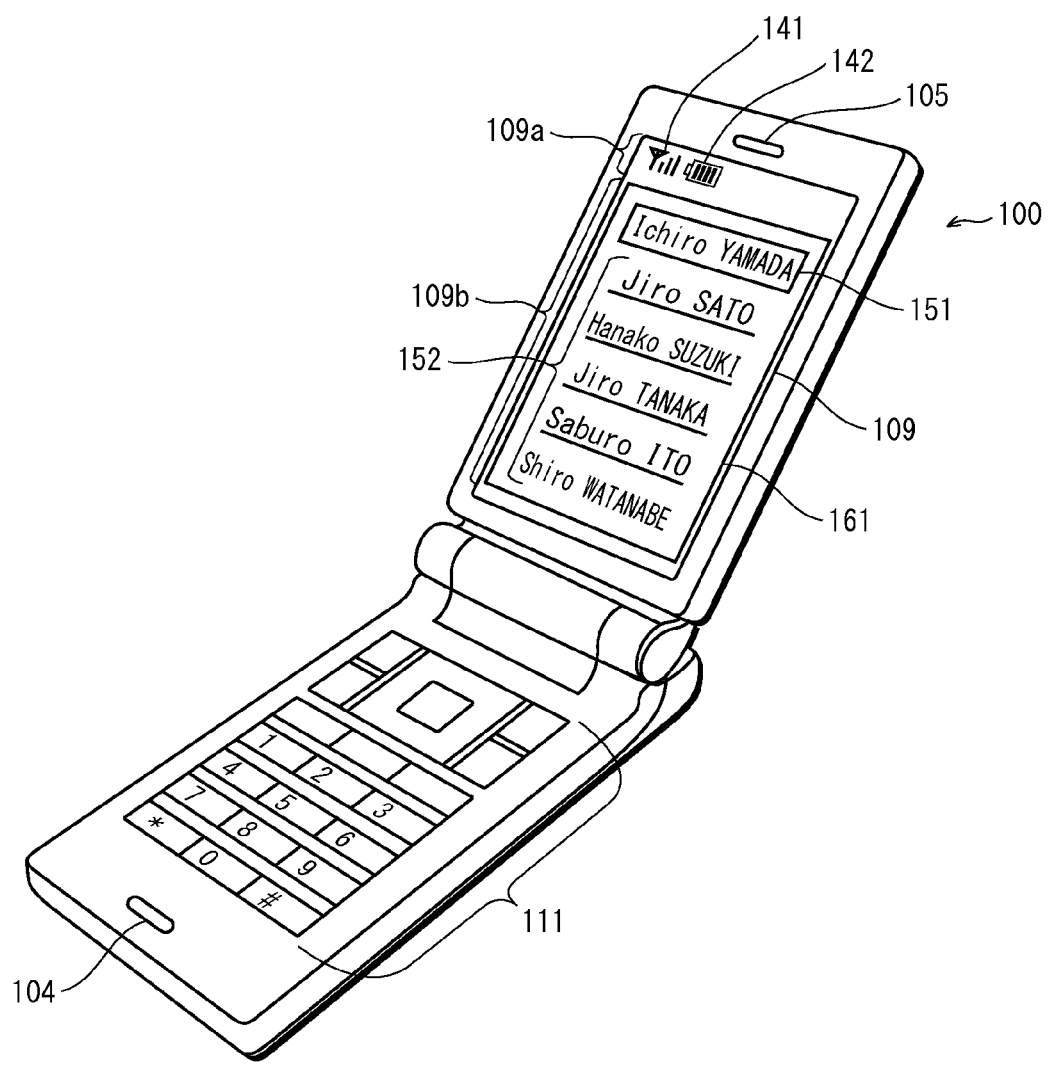
FIG. 1 is an oblique external view of a mobile phone 100.

As is seen from the external view of FIG. 1, the mobile phone 100 can display a participant list 161 during a PTT call. The participant list 161 comprises the names of the participants in the PTT call. More specifically, the participant list 161 comprises the name 151 of the Floor holder and the names 152 of the other participants. The name 151 is the name of the participant who is currently granted the Floor. The names 152 are the names of the participants other than the one who is currently granted the Floor. As shown in FIG. 1, the name 151 of the Floor holder may be displayed at the top of the participant list 161, and the names 152 of the other participants may be displayed below the name 151. Yet, it is not necessary that the name 151 is displayed at the top. As shown in FIG. 1, the name 151 of the Floor holder may be bounded by a box for distinction with the names 152 of the other participants.

In addition, the mobile phone 100 may have various other applications (i.e., functions) for, for example, mail transmission/reception and display, playback of music and video, reception and playback of television broadcast, picture taking and display, telephone directory display and edit, and various settings. The mobile phone 100 may display various screens for the user to operate the respective applications.

Figure 2:
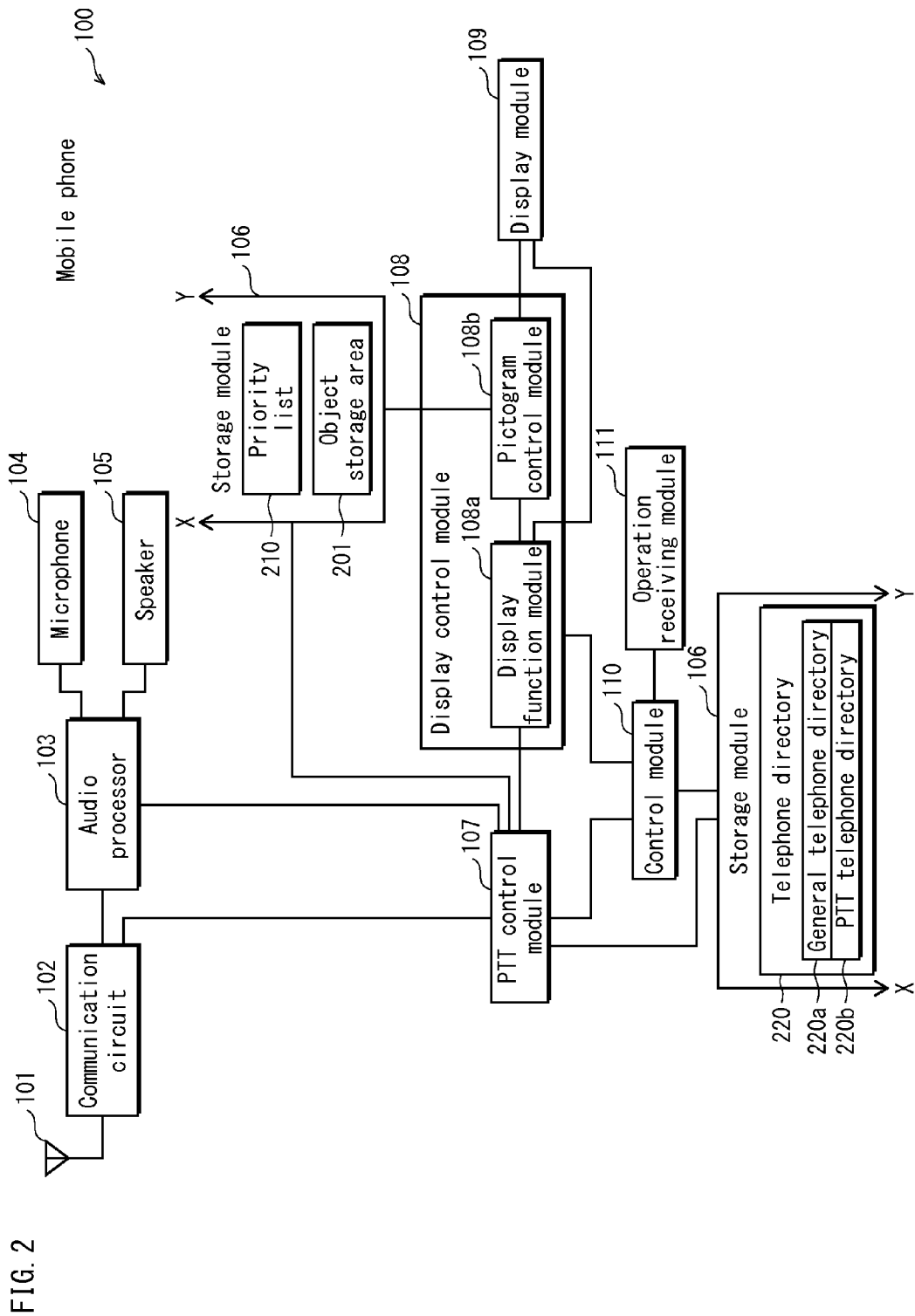
FIG. 2 is a block diagram of the mobile phone 100.

As shown in FIG. 2, the mobile phone 100 comprises an antenna 101, a communication circuit 102, an audio processor 103, a microphone 104, a speaker 105, a storage module 106, a PTT control module 107, a display control module 108, a display module 109, a control module 110, and an operation receiving module 111.

The storage module 106 comprises a nonvolatile semiconductor memory. The storage module 106 has an object storage area 201, a priority list 210, and a telephone directory 220.

Figure 3:
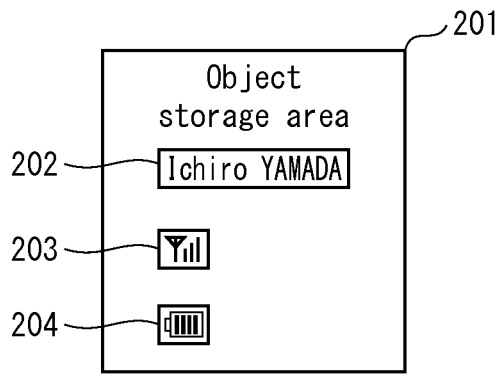
FIG. 3 shows an example of objects stored in an object storage area 201.

The object storage area 201 can store a plurality of objects to be displayed in a status line 109a, which will be described later. Each of the objects may be an image. As in the example shown in FIG. 3, the plurality of objects stored in the object storage area 201 comprise an object 202 and icons 203 and 204.

The object 202 is an image representing the Floor holder name. The object 202 may comprise the name of the participant currently holding the Floor. The icon 203 is an image representing the reception strength of the receiving signal of the mobile phone 100 (i.e., the signal strength icon). The icon 204 is an image representing the remaining power of the secondary battery of the mobile phone 100 (i.e., the battery icon).

As shown in FIG. 1, the icons 203 and 204 are displayed respectively as icons 141 and 142 in the status line 109a.

The priority list 210 indicates one or more objects to be displayed in the status line 109a. In the status line 109, at least one or more objects are displayed, out of the objects stored in the object storage area 201. The priority list 210 may indicate the objects to be displayed in the status line 109, in the form of data table. Only those objects having the highest priority level in the priority list 210 may be displayed in the status line 109a.

Figure 4:
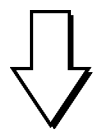
FIG. 4 is a view showing an example data structure of a priority list 210, and an example data structure of a priority list 210*a* after addition of the Floor holder name.

As in the example shown in FIG. 4, the priority list 210 comprises a plurality of pieces of object information. Each piece of object information comprises a priority level and an object ID. The object ID is identification information identifying an object stored in the object storage area 201. The priority level indicates the priority rank assigned to the object identified by the object ID. The priority level with a smaller value indicates a higher priority rank.

Only those objects identified by the object IDs corresponding to the highest priority level in the priority list 210 may be displayed in the status line 109a.

In the example shown in FIG. 4, the priority list 210 comprises pieces of object information 211 and 212. The piece of object information 211 has the priority level "1" and the object ID "P-1". "P-1" is identification information identifying the icon 203 shown in FIG. 3. The piece of object information 212 has the priority level "1" and the object ID "P-2". "P-2" is identification information identifying the icon 204 shown in FIG. 3. That is, the priory levels of the respective pieces of object information 211 and 212 are the same. In addition, the priority list 210 shown in FIG. 4 does not comprise any piece of object information having a different priority level. Consequently, the icons 203 and 204 are displayed in the status line 109a.

Another priority list 210a shown in FIG. 4 differs from the priority list 210 in that a piece of object information 213 indicating the Floor holder name is added.

The priority list 210a shown in FIG. 4 comprises pieces of object information 213, 214, and 215. The piece of object information 213 has the priority level "1" and the object ID "N-1". "N-1" is identification information identifying the object 202 shown in FIG. 3. The object 202 represents the Floor holder name. The piece of object information 214 has the priority level "2" and the object ID "P-1". Similarly, the piece of object information 215 has the priority level "2" and the object ID "P-2". That is, the priority level of the object information 213 is higher than the priority level of the pieces of object information 214 and 215. Consequently, according to the priority list 210a, the object 202 representing the Floor holder name is displayed in the status line 109a.

The telephone directory 220 comprises a general telephone directory 220a and a PTT telephone directory 220b. The general telephone directory 220a is used for general calls (i.e., calls other than PTT calls). On the other hand, the PTT telephone directory 220b is used for PTT calls.

The general telephone directory 220a comprises a plurality of pieces of contact information. Each piece of contact information in the general telephone directory 220a may comprise the name, telephone number, mail address, postal address, and so on of a potential participant in a general call.

Similarly, the PTT telephone directory 220b comprises a plurality of pieces of contact information. Each piece of contact information in the PTT telephone directory 220b may comprise the name, ID (i.e., telephone number to be more specific), and so on of a potential participant in a PTT call. The PTT telephone directory 220b is managed in synchronism between the mobile phone 100 and the server that mediates PTT calls. In other words, the PTT telephone directory 220b stored in the mobile phone 100 and the PTT telephone directory stored in the server are updated each time either of the PTT telephone directories is updated to maintain the data integrity.

The antenna 101 transmits and receives radio signals to or from base stations (not illustrated) via radio links. The communication circuit 102 carries out such processes as the selection and conversion of the frequency of radio signals received and transmitted with the antenna 101.

The speaker 105 can output acoustic reproduction, such as voice.

The microphone 104 can receive acoustic input, such as voice.

The audio processor 103 can demodulate a voice signal received from the communication circuit 102 and output a resulting acoustic signal to the speaker 105. In addition, the audio processor 103 can modulate an acoustic signal received from the microphone 104 into an audio signal in the form of electric signal and cause the communication circuit 102 to transmit the resulting electric signal.

The operation receiving module 111 comprises various keys and buttons, including a power key to switch ON and OFF the mobile phone 100, numeric keys, a talk button, and so on. In response to a user operation to any of the keys and buttons, the operation receiving module 111 can generate operation information indicating the key or button operated and output the thus generated operation information to the control module 110.

As shown in FIG. 1, the display module 109 comprises two display areas, namely a status display area 109a (which is also referred to as a common display area or a pictogram line) and a function screen display area 109b.

The display module 109 can display one or more icons representing the basic status of the mobile phone 100 in the status display area 109a (such an icon may also be referred to as a status display image). The status display area 109a covers an area of a size corresponding to one line of display items. In this display area of the size of one line of icons, one or more icons are displayed. For this reason, the status display area 109a may also be referred to as the status line 109a. In the following description, the display area is referred to as the status line 109a. The basic status comprises information about the reception strength of the receiving signal of the mobile phone 100, the remaining power of the secondary battery of the mobile phone 100, and so on. In one example, the icon 141 representing the reception strength of the receiving signal of the mobile phone 100 and the icon 142 representing the remaining power of the secondary battery of the mobile phone 100 are displayed in the status line 109a. In addition, the display module 109 can display information related to a PTT call in the status line 109a, as will be described latter.

The display module 109 can also display various other screens in the function screen display area 109b. Examples of the screens that can be displayed in the function screen display area 109b comprise a home screen, a screen for mail manipulation, a screen of a listing of mail messages in the inbox, a screen for creating a new mail message, and a setting screen.

Figure 5:
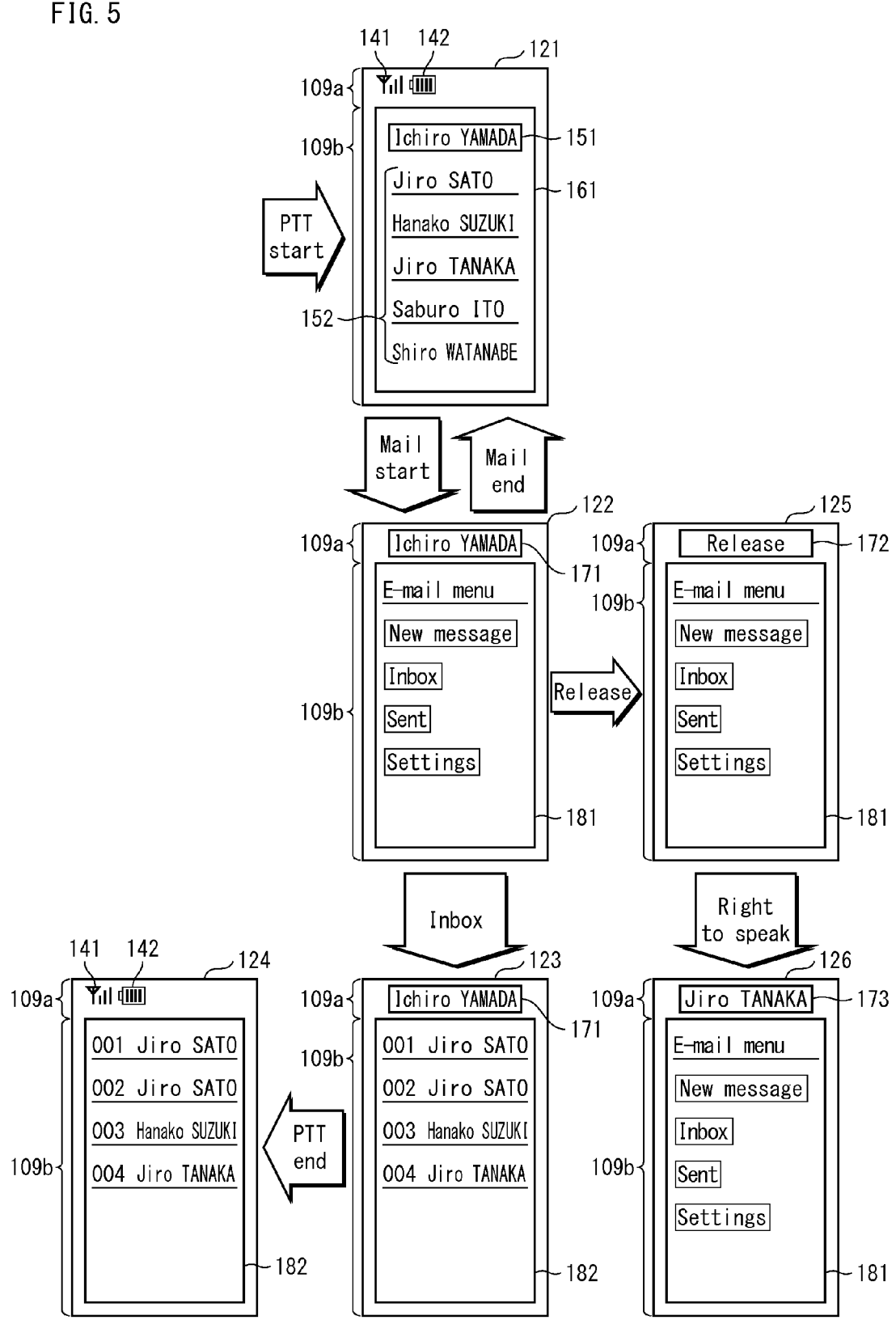
FIG. 5 is a view showing transition between screens displayed on a display module 109.

FIG. 5 shows transition between screens displayed on the display module 109.

As shown in FIG. 5, the display module 109 displays a screen 121 upon start of a PTT call. In the screen 121, the icons 141 and 142 are displayed in the status line 109a. In addition, the participant list 161 is displayed in the function screen display area 109b. As has been described above, the participant list 161 comprises the name 151 of the Floor holder as well as the names 152 of the other participants.

In the state where the display module 109 displays the screen 121, suppose, for example, that the mail function is activated. Then, the display module 109 displays a screen 122. In the screen 122, an object 171 representing the Floor holder name is displayed in the status line 109a. In addition, a menu 181 is displayed in the function screen display area 109b. The menu 181 comprises a title and menu items. The title indicates that the menu relates to the mail functions, whereas each menu item corresponds to a selectable mail function.

In the state where the display module 109 displays the screen 122, suppose that the Floor is released. Then, the display module 109 displays a screen 125. In the screen 125, an object 172 representing release information indicating that the Floor is released is displayed in the status line 109a. At the same time, the menu 181 is still displayed in the function screen display area 109b.

In the state where the display module 109 displays the screen 125, suppose that the Floor is newly granted. Then, the display module 109 displays a screen 126. In the screen 126, an object 173 representing the name of the new Floor holder is displayed in the status line 109a. At the same time, the menu 181 is still displayed in the function screen display area 109b.

In the state where the display module 109 displays the screen 122, suppose that the "inbox" is selected from the list of the selectable mail functions. Then, the display module 109 displays a screen 123. In the screen 123, the object 171 is displayed in the status line 109a. At the same time, a received mail list 182 showing a listing of received mail messages is displayed in the function screen display area 109b. The mail messages comprised in the received mail list 182 are stored in the storage module 106.

In the state where the display module 109 displays the screen 123, suppose that a user operation for terminating the PTT call is made. Then, the display module 109 displays a screen 124. In the screen 124, the icons 141 and 142 are displayed again in the status line 109a. At the same time, the received mail list 182 is still displayed in the function screen display area 109b.

The PTT control module 107 can control PTT calls in the following manner.

The PTT control module 107 receives, from the operation receiving module 111 via the control module 110, operation information indicating a user operation made to start a PTT call. Upon receipt of the operation information, the PTT control module 107 logs in to the server. This starts a PTT call.

In addition, the PTT control module 107 receives a notification of participants of the PTT call. More specifically, the PTT control module 107 acquires a Floor holder ID from the server if there already is a Floor holder. The PTT control module 107 also acquires participant IDs of as many participants as present. The PTT control module 107 also receives information indicating release of the Floor from the server. In other words, the PTT control module 107 receives, from the server, a notification that the right to speak in the PTT call is released. The PTT control module 107 also receives a notification of a new Floor holder. More specifically, the PTT control module 107 receives, from the server, the Floor holder ID of the new Floor holder. During the PTT call, the PTT control module 107 may also receive, from the operation receiving module 111 via the control module 110, operation information indicating a user operation made to terminate an application other than PTT (hereinafter, such an application may also be referred to as a "non-PTT application") or to terminate the PTT.

Each time a Floor holder ID is acquired, the PTT control module 107 retrieves the Floor holder name having the matching Floor holder ID from the PTT telephone directory 220b. Also, each time a participant ID is acquired, the PTT control module 107 retrieves the name of the participant having the matching participant ID form the PTT telephone directory 220b. Next, the PTT control module 107 generates the participant list 161 of the names of the Floor holder and participants. The thus generated participant list 161 is output to the display module 109 via a display function module 108a.

When operation information indicating a user operation made to activate a non-PTT application is received during the PTT call, the PTT control module 107 generates an object representing the Floor holder name and writes the thus generated object to the object storage area 201. Next, the PTT control module 107 updates the priority list 210 to assign the highest priority level to the piece of object information including the object ID identifying the object representing the Floor holder name. Next, the PTT control module 107 issues a pictogram update request to the display function module 108a and a pictogram control module 108b.

When a notification of Floor release is received during the PTT call, the PTT control module 107 deletes the object representing the Floor holder name from the object storage area 201. Next, the PTT control module 107 generates an object representing the "Floor release" and writes the thus generated object to the object storage area 201. The PTT control module 107 then updates the priority list 210 to assign the highest priority level to the piece of object information including the object ID identifying the object representing the "Floor release". Next, the PTT control module 107 issues a pictogram update request to the display function module 108a and the pictogram control module 108b.

When the Floor holder ID identifying a new Floor holder is received during the PTT call, the PTT control module 107 retrieves the Floor holder name having the matching the Floor holder ID from the PTT telephone directory 220b. Next, the PTT control module 107 generates an object representing the Floor holder name thus read. Next, the PTT control module 107 writes the thus generated object to the object storage area 201. Next, the PTT control module 107 updates the priority list 210 to assign the highest priority level to the piece of object information including the object ID identifying the object representing the Floor holder name. Next, the PTT control module 107 issues a pictogram update request to the display function module 108a and the pictogram control module 108b.

When operation information indicating a user operation made to terminate a non-PTT application or PTT is received during the PTT call, the PTT control module 107 checks the object storage area 201 to see if any object representing the Floor holder name or representing the "Floor release" is stored. If either of such objects is stored, the PTT control module 107 deletes that object which represents the Floor holder name or the "Floor release" from the object storage area 201. Next, the PTT control module 107 updates the priority list 210 by deleting the piece of object information including the object ID identifying the object representing the Floor holder name or "Floor release". Next, the PTT control module 107 issues a pictogram update request to the display function module 108a and the pictogram control module 108b.

The display control module 108 comprises the display function module 108a and the pictogram control module 108b.

The display control module 108 receives operation information from the operation receiving module 111 via the control module 110. When the operation information received during the PTT call indicates a user operation requesting to display a screen relevant to a non-PTT application, the display control module 108 controls the display function module 108a and the pictogram control module 108b in the following manner so as to display information relevant to the PTT call in the status line 109a.

The display function module 108a generates display contents for the non-PTT application, outputs the display contents to the display module 109, and controls the display module 109 to display the display contents. In addition, on receipt of a pictogram update request from the PTT control module 107, the display function module 108a outputs the received pictogram update request to the pictogram control module 108b.

The pictogram control module 108b receives the pictogram update request from the PTT control module 107 via the display function module 108a. Upon receipt of the pictogram update request, the pictogram control module 108b selects the object ID having the highest priority level in the priority list 210. The pictogram control module 108b specifies the object identified by the thus selected object ID as the object to be displayed in the status line 109a. Next, the pictogram control module 108b reads the thus specified object from the object storage area 201. Then, the pictogram control module 108b outputs the thus read object to the display module 109 and controls the display module 109 to display the object in the status line 109a. As a consequence, the object relevant to the PTT call is displayed in the status line 109a.

The control module 110 can control the components of the mobile phone 100, namely the antenna 101, the communication circuit 102, the audio processor 103, the microphone 104, the speaker 105, the storage module 106, the PTT control module 107, the display control module 108, the display module 109, and the operation receiving module 111.

In addition, the control module 110 receives operation information indicating a user operation made to start a PTT call from the operation receiving module 111 and outputs the thus received operation information to the PTT control module 107. In addition, the control module 110 receives operation information indicating a user operation of requesting to display a screen relevant to the activation of an application or to an application from the operation receiving module 111, and outputs the received operation information to the display control module 108.

The following describes operations of the mobile phone 100.

Figure 6:
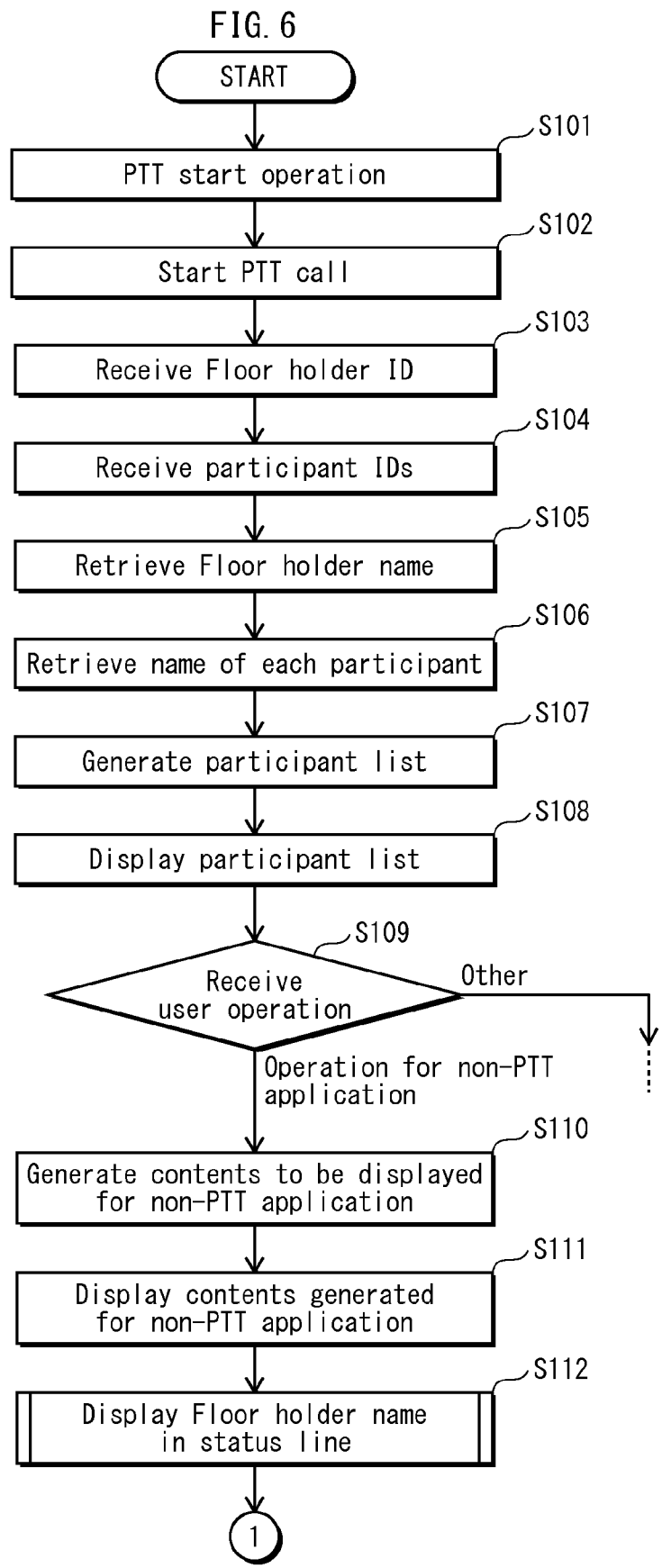
FIG. 6 is a flowchart of operations of the mobile phone 100 (continued on FIG. 7).
Figure 7:
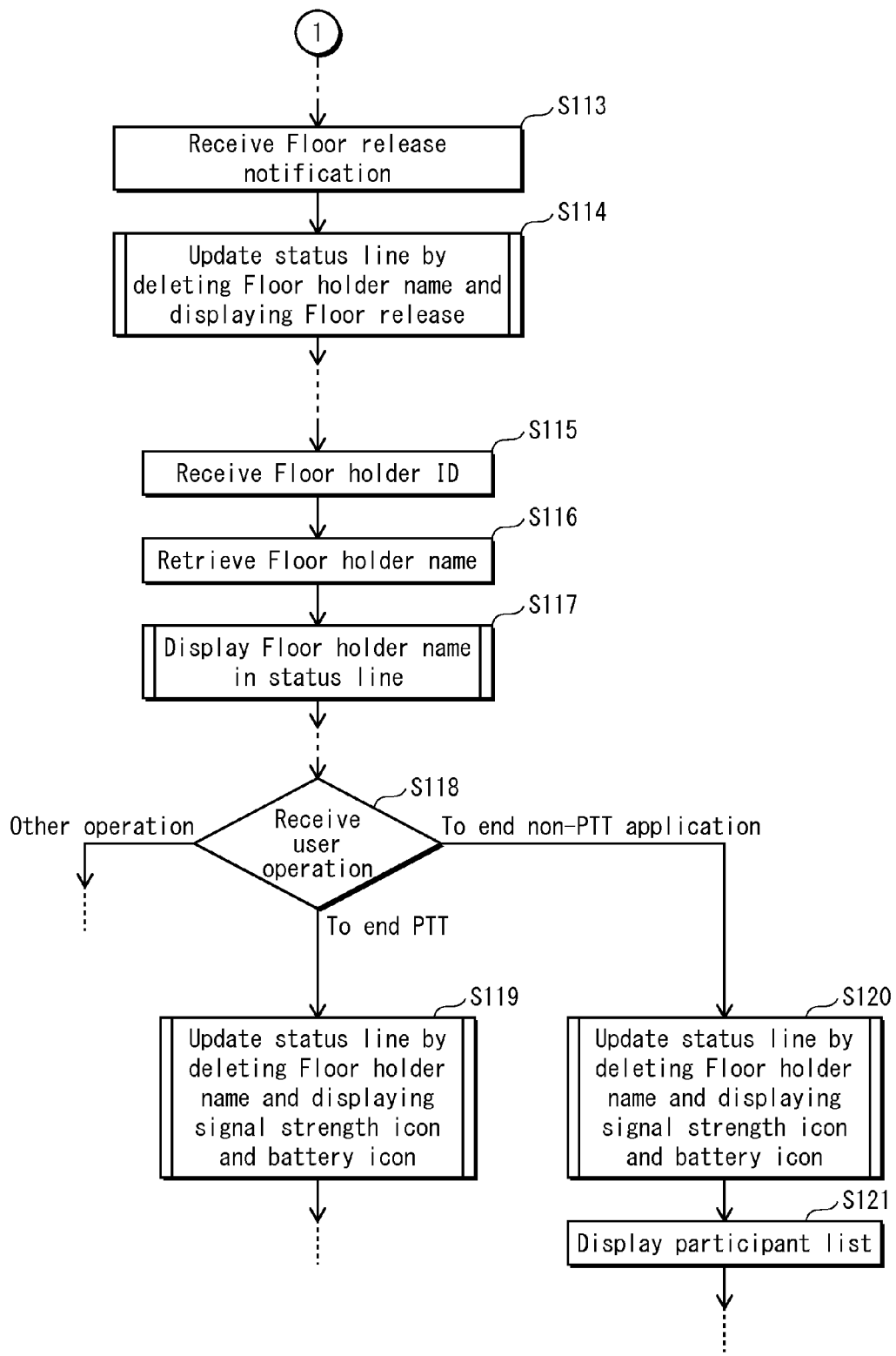
FIG. 7 is a flowchart of operations of the mobile phone 100 (continued from FIG. 6).

First, a description is given of operations of the mobile phone 100 relevant to a PTT call, with reference to the flowcharts shown in FIGS. 6 and 7. The description given here focuses on the operations performed when a non-PTT application is activated during a PTT call.

When the operation receiving module 111 receives a user operation made to start a PTT call (Task S101), the PTT control module 107 logs in to the server to start a PTT call (Task S102).

If there is a Floor holder, the PTT control module 107 receives the Floor holder ID from the server (Task S103). If there is any participant, the PTT control module 107 receives the participant ID of each participant from the server (Task S104).

Next, the PTT control module 107 retrieves the Floor holder name corresponding to the Floor holder ID from the PTT telephone directory 220b (Task S105) and retrieves the name of the participant corresponding to each participant ID from the PTT telephone directory 220b (Task S106). Next, the PTT control module 107 generates the participant list 161 that comprises the names of the Floor holder and of participants read in Tasks S105 and S106 (Task S107). The display module 109 displays the participant list 161 in the function screen display area 109b (Task S108).

Next, the operation receiving module 111 receives a user operation (Task S109).

If the received user operation is other than that for operating a non-PTT application or if the received user operation is for operating a non-PTT application but does not involve display of a screen (Task S109: Other), the control module 110 activates the function according to the received user operation.

On the other hand, if the received user operation is for operating a non-PTT application and involves display of a screen (Task S109: Operation of non-PTT application), the display function module 108a generates the display contents for the non-PTT application (Task S110), and the display module 109 displays the contents of the non-PTT application in the function screen display area 109b (Task S111).

Next, the display module 109 displays the object representing the Floor holder name in the status line 109a (Task S112).

When the PTT control module 107 receives a notification of the Floor release (Task S113), the display module 109 updates the status line 109a by deleting the object representing the Floor holder name and instead displaying the object representing the Floor release (Task S114).

When the PTT control module 107 receives the Floor holder ID of a new Floor holder (Task S115), the PTT control module 107 retrieves the Floor holder name corresponding to the Floor holder ID from the PTT telephone directory 220b and generates an object representing the Floor holder name just retrieved (Task S116). Next, the display module 109 displays the object representing the name of the new Floor holder in the status line 109a (Task S117).

When the operation receiving module 111 receives a user operation made to end the PTT call (Task S118: "To end PTT"), the display module 109 deletes the object representing the Floor holder name from the status line 109a. Next, the display module 109 displays the icon representing the strength of the receiving signal and the icon representing the remaining power of the secondary battery of the mobile phone in the status line 109a (Task S119).

When the operation receiving module 111 receives a user operation made to end a non-PTT application (Task S118: "To end non-PTT application"), the display module 109 deletes the object representing the Floor holder name from the status line 109a. Next, the display module 109 displays the icon representing the strength of the receiving signal and the icon representing the remaining power of the secondary battery of the mobile phone in the status line 109a (Task S120). Then, the display module 109 displays the participant list 161 (Task S121).

When the operation receiving module 111 receives a user operation other than that for ending the PTT or non-PTT application (Task S118: "Another operation"), the control module 110 activates a function corresponding to the received operation.

Figure 8:
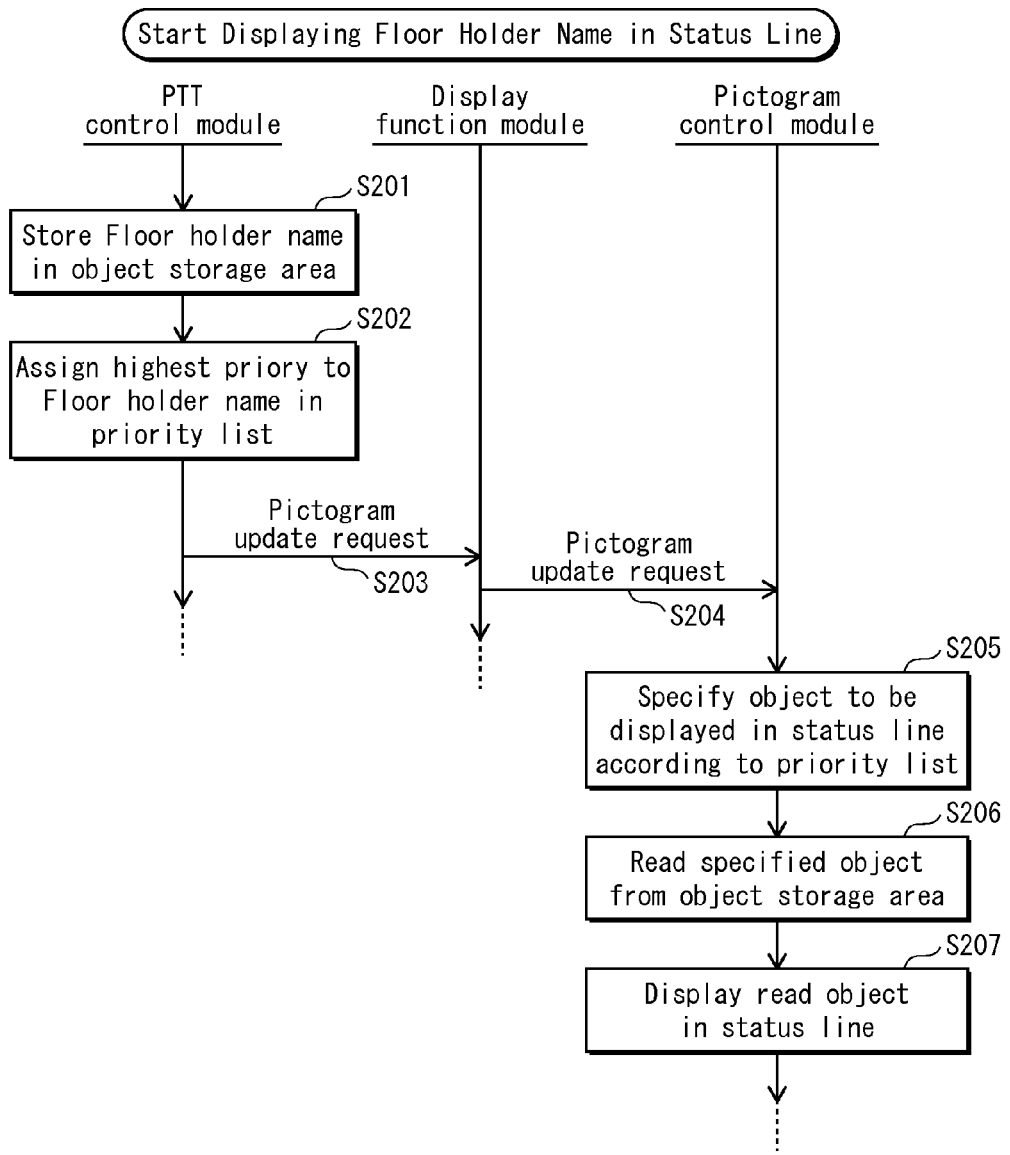
FIG. 8 is a sequence diagram showing operations for displaying the Floor holder name in a status line 109*a*.

FIG. 8 is a sequence diagram illustrating operations for displaying the object representing the Floor holder name in the status line 109a. This illustration gives the details of the Task S112 of the flowchart shown in FIG. 6.

The PTT control module 107 generates an object representing the Floor holder name and writes the thus generated object in the object storage area 201 (Task S201). Next, the PTT control module 107 updates the priority list 210 to assign the highest priority level to the piece of object information including the object ID. The object ID subjected to this task is identification information identifying the object that represents the Floor holder name (Task S202).

Next, the PTT control module 107 issues a pictogram update request to the pictogram control module 108b via the display function module 108a. The pictogram control module 108b receives the pictogram update request (Tasks S203 and S204).

The pictogram control module 108b specifies the object to be displayed in the status line 109a, by using the priority list 210. In this case, the object representing the Floor holder name is specified as the object to be displayed in the status line 109a (Task S205). Next, the pictogram control module 108b reads the thus specified object from the object storage area 201 (Task S206). Then, the pictogram control module 108b outputs the thus read object to the display module 109 and controls the display module 109 to display the object in the status line 109a. The display module 109 displays the object representing the Floor holder name in the status line 109a (Task S207).

Through the above tasks, the object representing the Floor holder name is displayed. With this arrangement, the user is kept informed of the Floor holder name. Here, the Floor holder name is one information item relevant to the PTT call.

Figure 9:
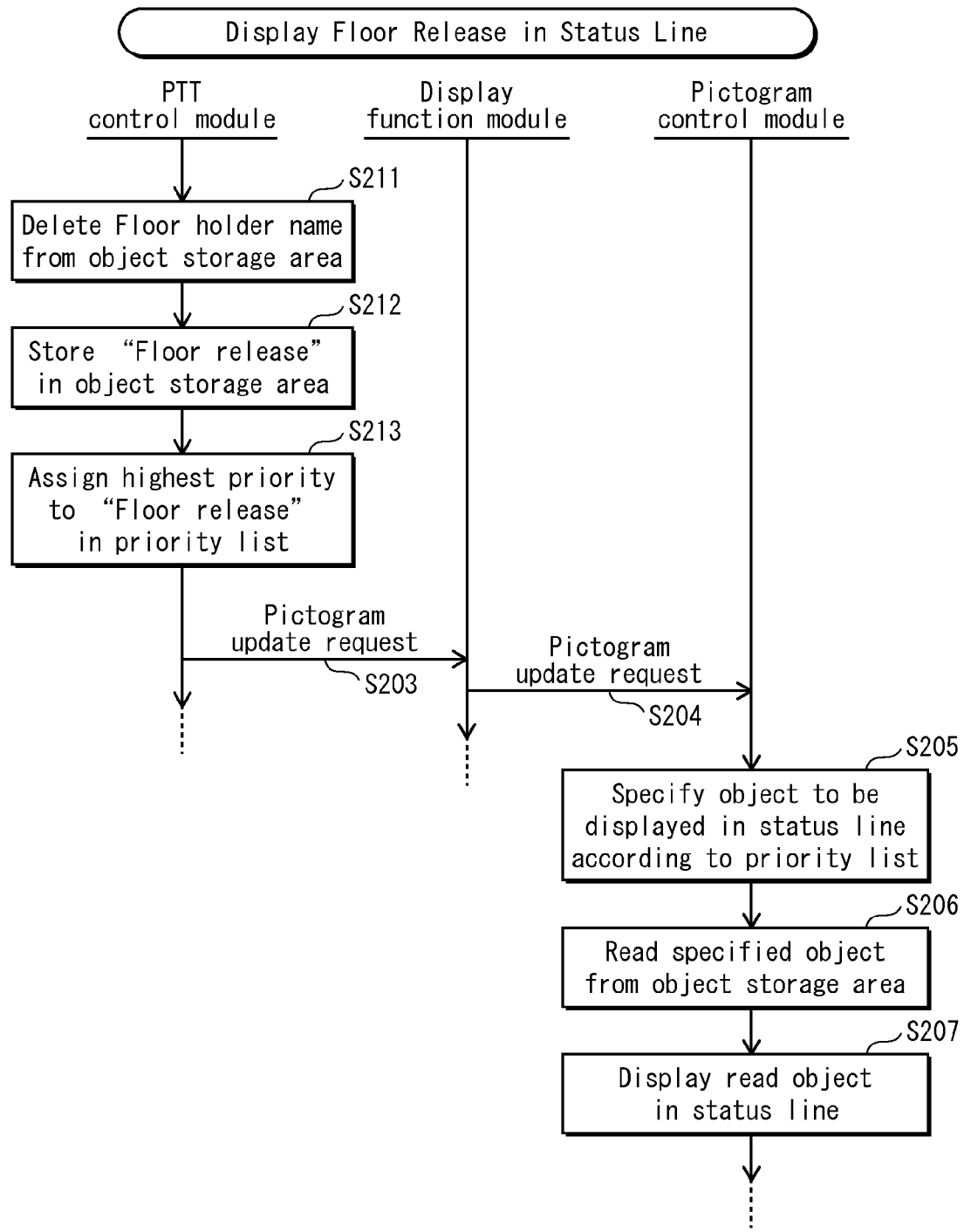
FIG. 9 is a sequence diagram showing operations for displaying a Floor release in the status line 109*a*.

FIG. 9 is a sequence diagram illustrating operations for displaying the object representing the Floor release in the status line 109a. This illustration gives the details of the Task S114 of the flowchart shown in FIG. 7.

The PTT control module 107 deletes the object representing the Floor holder name from the object storage area 201 (Task S211). Next, the PTT control module 107 generates an object representing the "Floor release" and writes the thus generated object to the object storage area 201 (Task S212). Next, the PTT control module 107 updates the priority list 210 to assign the highest priority level to the piece of object information including the object ID. The object ID subjected to this task is identification information identifying the object representing the "Floor release" (Task S213).

Next, the PTT control module 107 issues a pictogram update request to the pictogram control module 108b via the display function module 108a. The pictogram control module 108b receives the pictogram update request (Tasks S203 and S204).

The pictogram control module 108b specifies the object to be displayed in the status line 109a, by using the priority list 210. In this case, the object representing the "Floor release" is specified as the object to be displayed in the status line 109a (Task S205). Next, the pictogram control module 108b reads the thus specified object from the object storage area 201 (Task S206). Then, the pictogram control module 108b outputs the thus read object to the display module 109 and controls the display module 109 to display the object in the status line 109a. The display module 109 displays the object representing the "Floor release" in the status line 109a (Task S207).

As a consequence, the object representing the "Floor release" is displayed in the status line 109a. The "Floor release" is one information item relevant to the PTT call.

With this arrangement, it is ensured that the user is informed of the Floor release.

Figure 10:
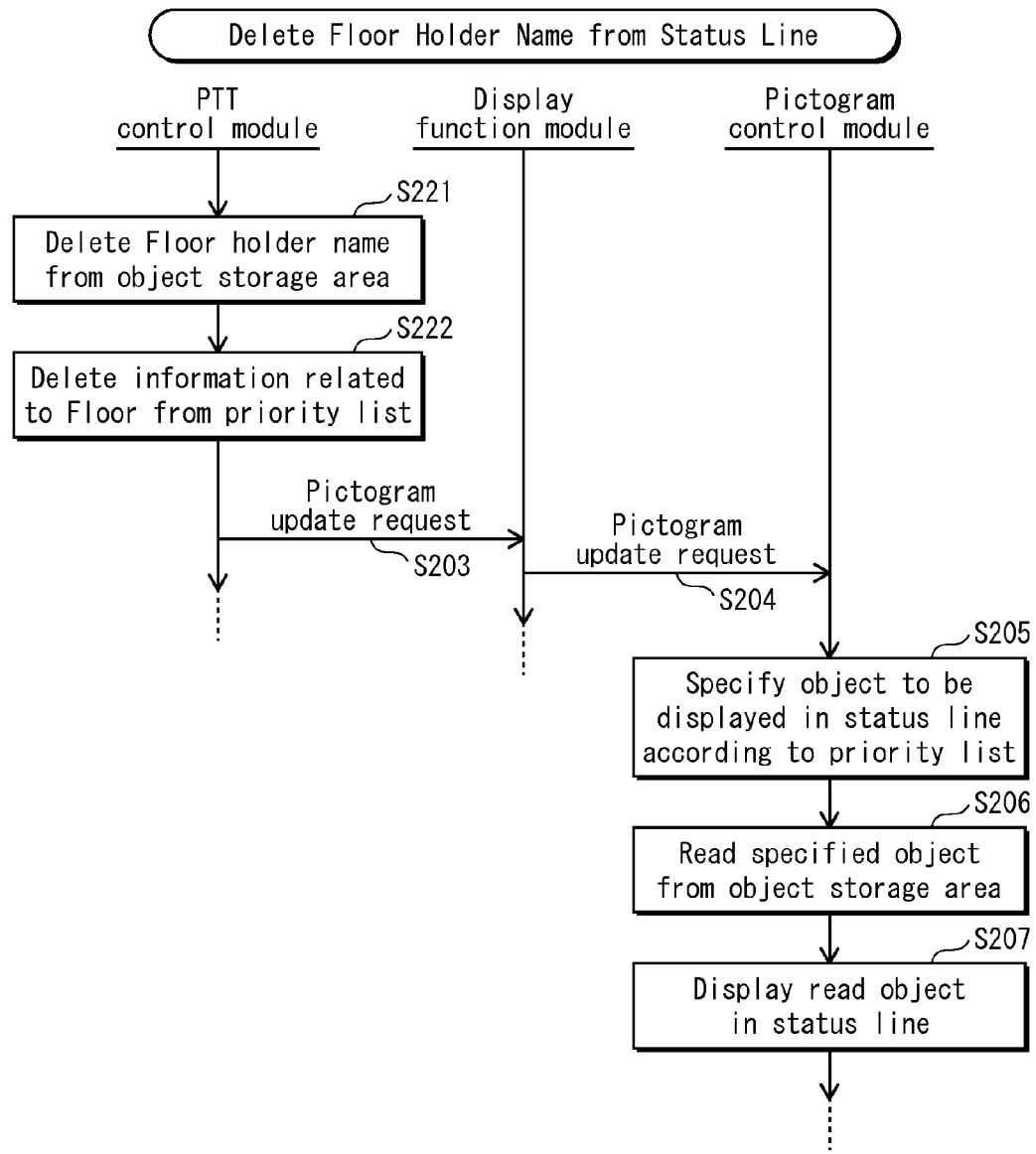
FIG. 10 is a sequence diagram showing operations for deleting the Floor holder name from the status line 109*a*.

FIG. 10 is a sequence diagram illustrating operations for deleting the object representing the Floor holder name from the status line 109a. This illustration gives the details of the Tasks S119 and S120 of the flowchart shown in FIG. 7.

The PTT control module 107 deletes the object representing the Floor holder name from the object storage area 201 (Task S221). Next, the PTT control module 107 deletes the piece of object information that comprises the object ID from the priority list 210. The object ID subjected to this task is identification information identifying the object that represents the Floor holder name (Task S222).

Next, the PTT control module 107 issues a pictogram update request to the pictogram control module 108b via the display function module 108a. The pictogram control module 108b receives the pictogram update request (Tasks S203 and S204).

The pictogram control module 108b specifies the object to be displayed in the status line 109a, by using the priority list 210. In this case, the icon 203 representing the reception strength of the receiving signal and the icon 204 representing the remaining power of the secondary battery are both specified as the objects to be displayed in the status line 109*a* (Task S205). Next, the pictogram control module 108*b* reads the thus specified objects from the object storage area 201 (Task S206). Then, the pictogram control module 108*b* outputs the thus read objects to the display module 109 and controls the display module 109 to display the objects in the status line 109*a*. The display module 109 displays the icon 203 representing the reception strength of the receiving signal as well as the icon 204 representing the remaining power of the secondary battery in the status line 109*a* (Task S207).

Consequently, the icon 203 representing the reception strength of the receiving signal and the icon 204 representing the remaining power of the secondary battery are both displayed in the status line 109*a*.

This arrangement ensures that the user is informed of the termination of the PTT or of a non-PTT application.

As has been described above, even in the case where a function other than the PTT function is activated during a PTT call, the information relevant to the PTT call is kept displayed in the status line 109*a*. With this arrangement, the user can visually acquire the information relevant to the PTT call. That is, the user can acquire information relevant to the PTT call even if information relevant to the other function is displayed during the PTT call.

For example, since the object representing the Floor holder name is displayed as the information relevant to the PTT call, the user is able to visually recognize the current speaker by looking at the object displayed in the status line, even if some of the participants in the PTT call have similar voices.

As shown in FIG. 5, according to the embodiment described above, the display module 109 displays the screen 122 in response to an activation of a mail function in the state where the screen 121 is displayed. Naturally, however, this is merely an example and the embodiment is not limited to such.

Figure 11:
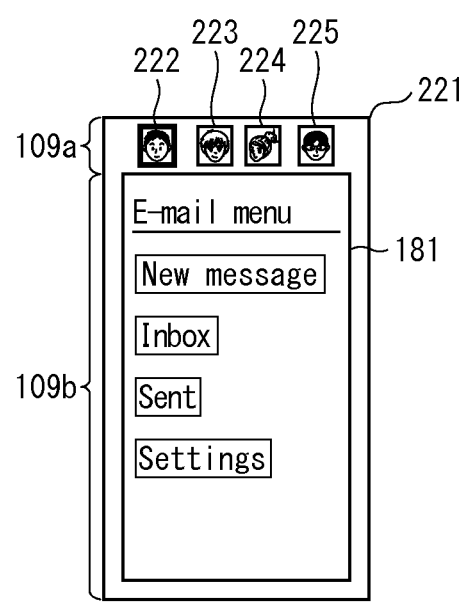
FIG. 11 is a screen 221 displayed on the display module 109, according to a modification.

The display module 109 may display a screen with which the user is enabled to visually recognize the participants in a PTT call. Also the display module 109 may display a screen with which the user is enabled to visually recognize the current Floor holder among the participants. For example, the display module 109 may display a screen 221 shown in FIG. 11, instead of the screen 122 shown in FIG. 5.

In the screen 221, user face icons 222, 223, 224, and 225 (i.e., icons representing the faces of the users) are displayed in the status line 109*a*. Here, one of the icons 222, 223, 224, and 225 may represent the face of the Floor holder. In the example shown in FIG. 11, the icon 222 represents the face of the current Floor holder. The icon 222 representing the face of the Floor holder is bounded by a thick line. This distinguishes the icon corresponding to the Floor holder from the icons corresponding to the other participants. That is, the box with the thick line is a mark indicating the Floor holder. The mark used to indicate the Floor holder is not limited to the thick line box. For examples, an arrow or an asterisk may be displayed at a position near the top left corner (or may be any of left bottom, top right, and bottom left corners) of the icon to indicate the Floor holder.

A set of the icons 222, 223, 224, and 225 representing the faces of the participants in the PTT call is one information item relevant to the PTT call.

At the same time, the menu 181 is still displayed in the function screen display area 109*b*.

Each piece of contact information comprised in the PTT telephone directory 220*b* comprises an icon representing the face of the contact in association with the ID of the contact, i.e., a potential participant in a PTT call.

Each time an participant ID is received, the PTT control module 107 retrieves a piece of path information indicating the storage location of the icon corresponding to the participant ID from the PTT telephone directory 220*b* and writes the thus retrieved path information and a Floor flag to the object storage area 201. The Floor flag indicates whether or not the participant represented by the icon shown by the piece of the path information corresponding to the Floor flag currently holds the Floor. The Floor flag set to "1" indicates that the corresponding participant currently holds the Floor. On the other hand, the Floor flag set to "0" indicates that the corresponding participant does not currently hold the Floor. The Floor flags are used to display the icons with a mark indicating the Floor holder.

Each time a Floor holder ID is received, the PTT control module 107 updates the stored contents of the object storage area 201 by setting the Floor flag corresponding to the Floor holder ID to "1". Similarly, each time a Floor release notification is received, the PTT control module 107 updates the stored contents of the object storage area 201 by changing the Floor flag set to "1" to "0".

Figure 12:
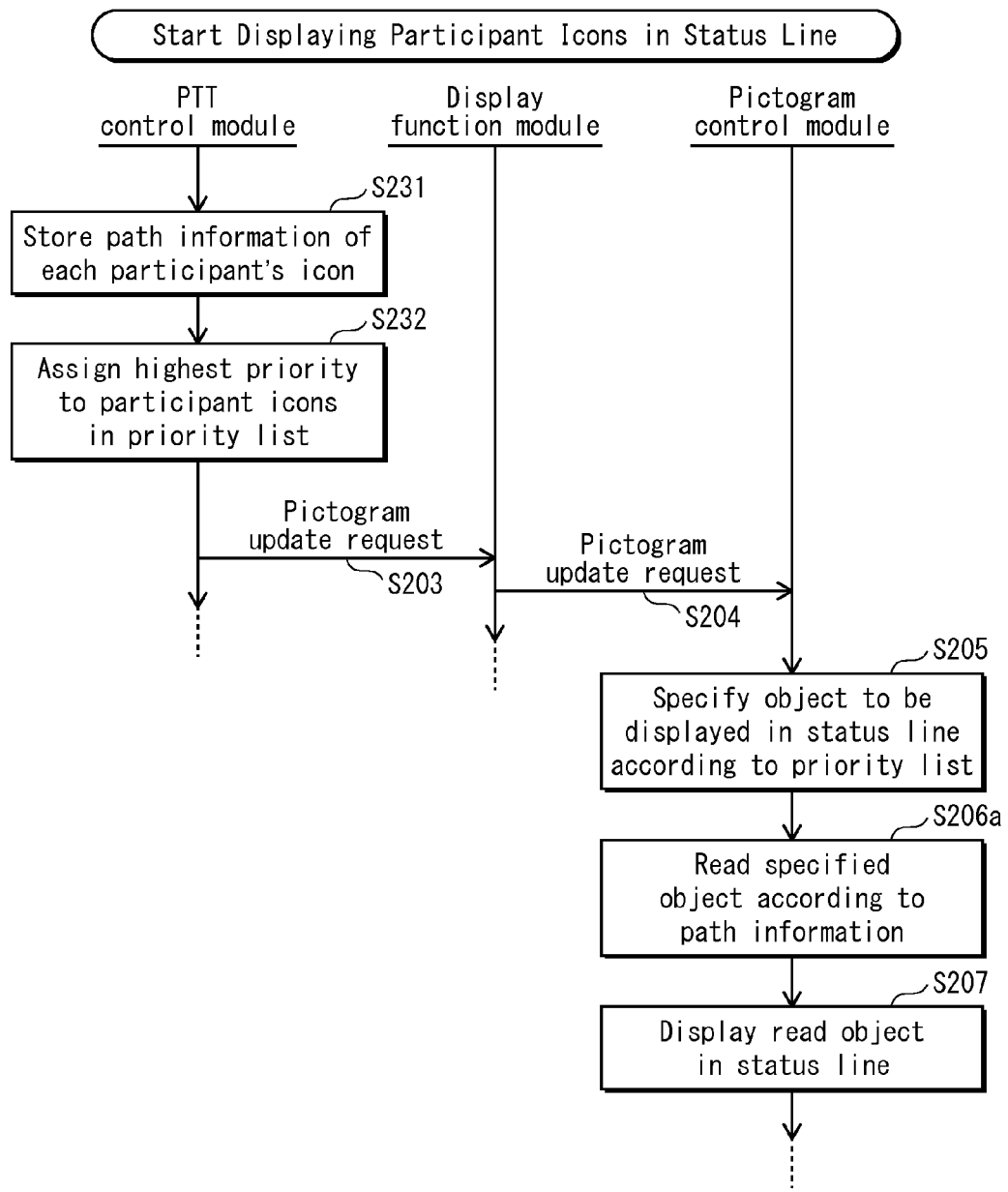
FIG. 12 is a sequence diagram showing operations for displaying icons representing participants in the status line 109*a*.

Next, the following describes the operations of the mobile phone 100 performed to display the icons representing the faces of the participants in the status line 109*a*, with reference to the sequence diagram shown in FIG. 12.

For each participant, the PTT control module 107 writes a piece of path information indicating the storage location of an icon representing the face of the participant and the Floor flag to the object storage area 201 (Task S231). The PTT control module 107 performs the writing or update of the path information and the Floor flag upon start of a PTT call or upon receipt of a notification of a change to the participants.

Next, the PTT control module 107 updates the priority list 210 to assign the highest priority level to the set of icons representing the faces of the participants. More specifically, the PTT control module 107 updates the priority level of the respective pieces of object information having the object IDs to "1". The object IDs subjected to this task are identification information identifying each of the icons representing the faces of the participants (Task S232).

Next, the PTT control module 107 issues a pictogram update request to the pictogram control module 108*b* via the display function module 108*a*. The pictogram control module 108*b* receives the pictogram update request (Tasks S203 and S204).

The pictogram control module 108*b* specifies the objects to be displayed in the status line 109*a*, by using the priority list 210. Here, the icons representing the faces of the participants are specified as the objects to be displayed (Task S205). Next, the pictogram control module 108*b* reads the path information corresponding to each of the thus specified objects from the object storage area 201. The pictogram control module 108*b* then reads the object (icon) located at the storage location indicated by each piece of path information (Task S206*a*). Then, the pictogram control module 108*b* outputs the thus read objects to the display module 109 and controls the display module 109 to display the objects in the status line 109*a*. The display module 109 displays the set of icons representing the faces of the participants in the status line (Task S207).

Through the above operations, a set of icons representing the faces of the participants is displayed in the status line 109*a*.

This arrangement enables the user to visually recognize the participants and the Floor holder of the PTT call.

As shown in FIG. 5, according to the embodiment described above, the display module 109 displays the screen 122 in response to an activation of a mail function in the state where the screen 121 is displayed. Naturally, however, this is merely an example and the embodiment is not limited to such.

According to one modification, the user is enabled to visually recognize the reception strength of the receiving signal and the remaining power of the secondary battery of the mobile phone 100, in addition to the Floor holder.

Figure 13:
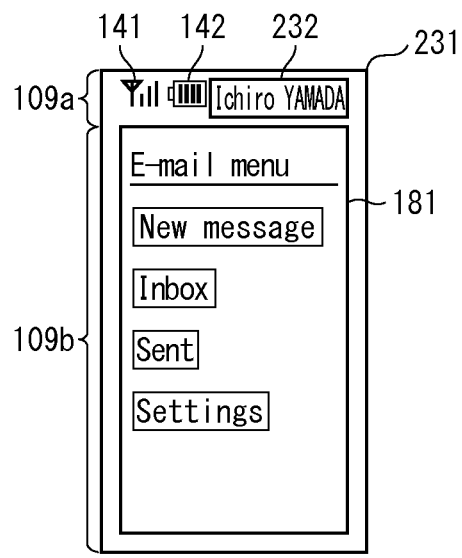
FIG. 13 is a screen 231 displayed on the display module 109, according to a modification.

In this case, the display module 109 may display a screen 231 shown in FIG. 13, instead of the screen 122 shown in FIG. 5.

In the screen 231, the object 232 representing the Floor holder name is displayed in the status line 109a, along with the icon 141 representing the reception strength of the receiving signal and the icon 142 representing the remaining power of the secondary battery.

At the same time, the menu 181 is still displayed in the function screen display area 109b.

In this case, the PTT control module 107 updates the priority list 210 to assign the highest priority level to the icons 141 and 142 and the object 232 representing the Floor holder name.

With this arrangement, the user is enabled to visually recognize the Floor holder name together with the basic status of the mobile phone 100.

As shown in FIG. 5, according to the embodiment described above, the display module 109 displays the screen 121 upon start of the PTT call. Naturally, however, this is merely an example and the embodiment is not limited to such.

It is sufficient as long as the user is enabled to visually recognize the participants in a PTT call. It is also sufficient as long as the user is enabled to specify the current Floor holder among the participants in a PTT call.

Figure 14:
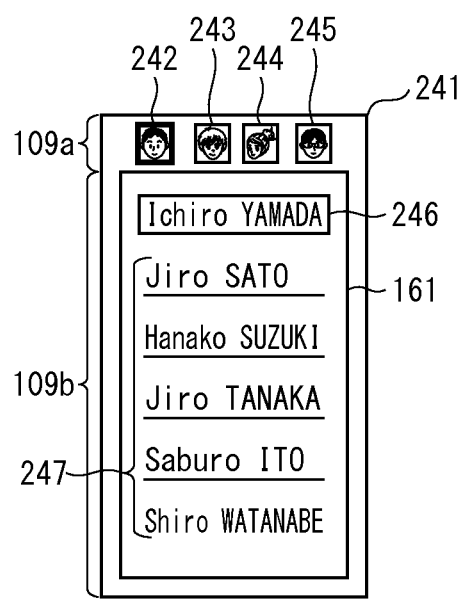
FIG. 14 is a screen 241 displayed on the display module 109, according to a modification.

In one modification, the display module 109 can display a screen 241 shown in FIG. 14 as one example, upon start of a PTT call.

In the screen 241, user face icons 242, 243, 244, and 245 (i.e., icons representing the faces of the users) are displayed in the status line 109a. Here, one of the icons 242, 243, 244, and 245 may be displayed so as to represent the face of the Floor holder. In the example shown in FIG. 14, the icon 242 is the one that represents the face of the current Floor holder. The icon 242 representing the face of the Floor holder is bounded by a thick line in distinction from the icons for the other participants.

In addition, the participant list 161, which is a listing of the names of the PTT call participants, is displayed in the function screen display area 109b.

In this case, the PTT control module 107 assigns the highest priority levels to the icons 242, 243, 244, and 245.

With this arrangement, the user is enabled to visually recognize the Floor holder from both text and icons displayed.

As shown in FIG. 5, according to the embodiment described above, the display module 109 displays the screen 122 in response to an activation of a mail function in the state where the screen 121 is displayed. Naturally, however, this is merely an example and the embodiment is not limited to such.

It is sufficient that the screen display enables the user to visually recognize the participants in a PTT call and the information relevant to the activated function.

Figure 15:
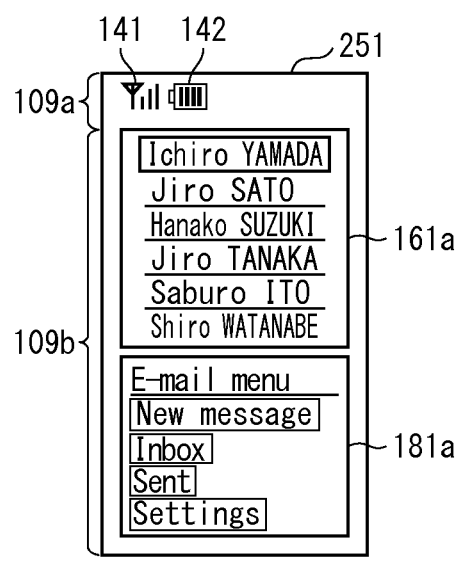
FIG. 15 is a screen 251 displayed on the display module 109, according to a modification.

In one modification, the display module 109 may display a screen 251 shown in FIG. 15 as one example, instead of the screen 122, when a mail function is activated during a PTT call.

In the screen 251, the icon 141 representing the reception strength of the receiving signal and the icon 142 representing the remaining power of the secondary battery are displayed again in the status line 109a.

In addition, the participant list 161a and the menu 181a are displayed in the function screen display area 109b. The participant list 161 a is a reduced version of the participant list 161 shown in FIG. 5. The menu 181a is a reduced version of the menu 181 shown in FIG. 5.

In this case, the PTT control module 107 assigns the highest priority levels to the icons 141 and 142.

In addition, the display function module 108a generates the participant list 161a and the menu 181a by reducing in size the participant list 161 and the menu 181, respectively. Next, the display function module 108a outputs the participant list 161a and the menu 181a to the display module 109 and controls the display module 109 to display both the participant list 161a and the menu 181a. Then, the display module 109 displays both the participant list 161a and the menu 181a.

With this arrangement, the user is enabled to recognize the participants and the Floor holder of a PTT call and at the same time to operate a non-PTT application.

In the above embodiment and each modification, the Floor holder name is displayed in the status line 109a. In addition, the display module 109 also displays the icon representing the face of the Floor holder in the status line 109a. In addition, the display module 109 also displays the icons representing the faces of the participants in the status line 109a. Naturally, however, this is merely an example and the embodiment is not limited to such.

It is sufficient that the user is enabled to recognize information relevant to the participants and the Floor holder.

For example, the display module 109 may display the telephone number or other identification information of the Floor holder in the status line 109a.

In another example, the display module 109 may display a graphic element or symbol used to identify the Floor holder. In addition, the display module 109 may display a graphic element or symbol used to identify each participant.

The mobile phone described above may be a computer system that comprises a microprocessor and memory. The memory stores a computer program, and the microprocessor operates according to the computer program.

The computer program is a set of computer instruction codes written to realize the predetermined functionality.

The computer program may be stored on a computer-readable non-transitory recording medium, such as a flexible disk, hard disk, CD-ROM m Mom DVD, DVD-ROM, DVD-RAM, BD (Blu-ray Disc), or semiconductor memory.

In addition the computer program may be transmitted via an electric telecommunication line, a wireless or wired communication line, a network typified by the Internet, data broadcasting, or the like.

In addition, the computer program may be transported in the form of the recording medium or transmitted via the network, or the like, so that the computer program may be executed by a separate, independent computer system.

Any of the above embodiment and modifications may be combined.

Terms and phrases used in this document, and variations hereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

REFERENCE SIGNS LIST 100 mobile phone
101 antenna
102 communication circuit
103 audio processor
104 microphone
105 speaker
106 storage module
107 PTT control module
108 display control module
108a display function module
108b pictogram control module
109 display module
110 control module
111 operation receiving module

The invention claimed is:

1. A mobile phone provided with a push-to-talk (PTT) function, the mobile phone comprising:
   a display that displays a screen comprising a status display area and a function screen display area, wherein the function screen display area is greater in size than the status display area; and
   at least one processor that
      receives a user operation,
      when the PTT function is not being performed, causes the display module to display one or more icons representing a status of the mobile phone in the status display area, and,
      while the PTT function is being performed,
         when no user operation for executing a function other than the PTT function is received, displays the one or more icons representing the status of the mobile phone in the status display area, and displays first information relevant to the PTT function in the function screen display area, and,
         when a user operation for executing a function other than the PTT function is received,
            displays second information relevant to the function other than the PTT function in the function screen display area instead of the first information,
            when a participant in the PTT function acquires a floor in the PTT function, causes the display module to display an identifier of the participant who is the floor holder in the status display area, and,
            when no participant in the PTT function is a floor holder, causes the display module to display an indication of a floor release in the status display area.

2. The mobile phone according to claim 1, wherein the at least one processor further receives a notification relevant to the PTT function, wherein the first information comprises contents of the notification.

3. The mobile phone according to claim 1, wherein the at least one processor receives, as the notification, first identification information identifying a participant in the PTT function that is a floor holder, and wherein the first information comprises an identification of the participant that is the floor holder.

4. The mobile phone according to claim 3, wherein the identification of the participant that is the floor holder comprises at least one of a telephone number, a name, or an icon associated with the participant that is the floor holder.

5. The mobile phone according to claim 4, wherein the at least one processor receives, as the notification, second identification information identifying one or more other participants in the PTT function, and wherein the first information further comprises an identification of each of the one or more other participants.

6. The mobile phone according to claim 5, wherein the identification of each of the participant that is the floor holder and the one or more other participants comprises an icon associated with the participant.

7. The mobile phone according to claim 4, wherein the at least one processor receives, as the notification, release information indicating that the floor is released.

8. The mobile phone according to claim 1, wherein the first information comprises at least one of a name of a current floor holder and an indication that the floor has been released.

9. The mobile phone according to claim 8, wherein the first information comprises at least one of a name of a current floor holder and an indication that the floor has been released.

10. The mobile phone according to claim 9, wherein the first information comprises at least one of a name of a current floor holder and an indication that the floor has been released.

11. The mobile phone according to claim 1, wherein the at least one processor is configured to, when the user operation for executing a function other than the PTT function is received while the PTT function is being performed:
   when a participant in the PTT function acquires a floor in the PTT function, cause the display module to display the identified of the participant who is the floor holder in the status display area instead of the one or more icons representing the status of the mobile phone; and,
   when no participant in the PTT function is a floor holder, cause the display module to display the indication of the floor release in the status display area instead of the one or more icons representing the status of the mobile phone.

12. The mobile phone according to claim 1, wherein the at least one processor is configured to, when the user operation for executing a function other than the PTT function is received while the PTT function is being performed:
   when a participant in the PTT function acquires a floor in the PTT function, cause the display module to display the identified of the participant who is the floor holder in the status display area along with the one or more icons representing the status of the mobile phone; and, when no participant in the PTT function is a floor holder, cause the display module to display the indication of the floor release in the status display area along with the one or more icons representing the status of the mobile phone.

13. A method for controlling a mobile phone provided with a push-to-talk (PTT) function, the method comprising:
when the PTT function is not being performed, displaying one or more icons representing a status of the mobile phone in a status display area; and,
while the PTT function is being performed,
when no user operation for executing a function other than the PTT function is received, displaying the one or more icons representing the status of the mobile phone in the status display area, and displaying first information relevant to the PTT function in a separate function screen display area, wherein the function screen display area is greater in size than the status display area, and,
when a user operation for executing a function other than the PTT function is received,
displaying second information relevant to the function other than the PTT function in the function screen display area instead of the first information,
when a participant in the PTT function acquires a floor in the PTT function, displaying an identifier of the participant who is the floor holder in the status display area, and,
when no participant in the PTT function is a floor holder, displaying an indication of a floor release in the status display area.

14. A non-transitory computer readable storage medium comprising computer-executable instructions for operating a mobile phone provided with a push-to-talk (PTT) function, the computer-executable instructions comprising:
when the PTT function is not being performed, displaying one or more icons representing a status of the mobile phone in a status display area; and,
while the PTT function is being performed,
when no user operation for executing a function other than the PTT function is received, displaying the one or more icons representing the status of the mobile phone in the status display area, and displaying first information relevant to the PTT function in a separate function screen display area, wherein the function screen display area is greater in size than the status display area, and,
when a user operation for executing a function other than the PTT function is received,
displaying second information relevant to the function other than the PTT function in the function screen display area instead of the first information,
when a participant in the PTT function acquires a floor in the PTT function, displaying an identifier of the participant who is the floor holder in the status display area, and,
when no participant in the PTT function is a floor holder, displaying an indication of a floor release in the status display area.

* * * * *